Figure 1:
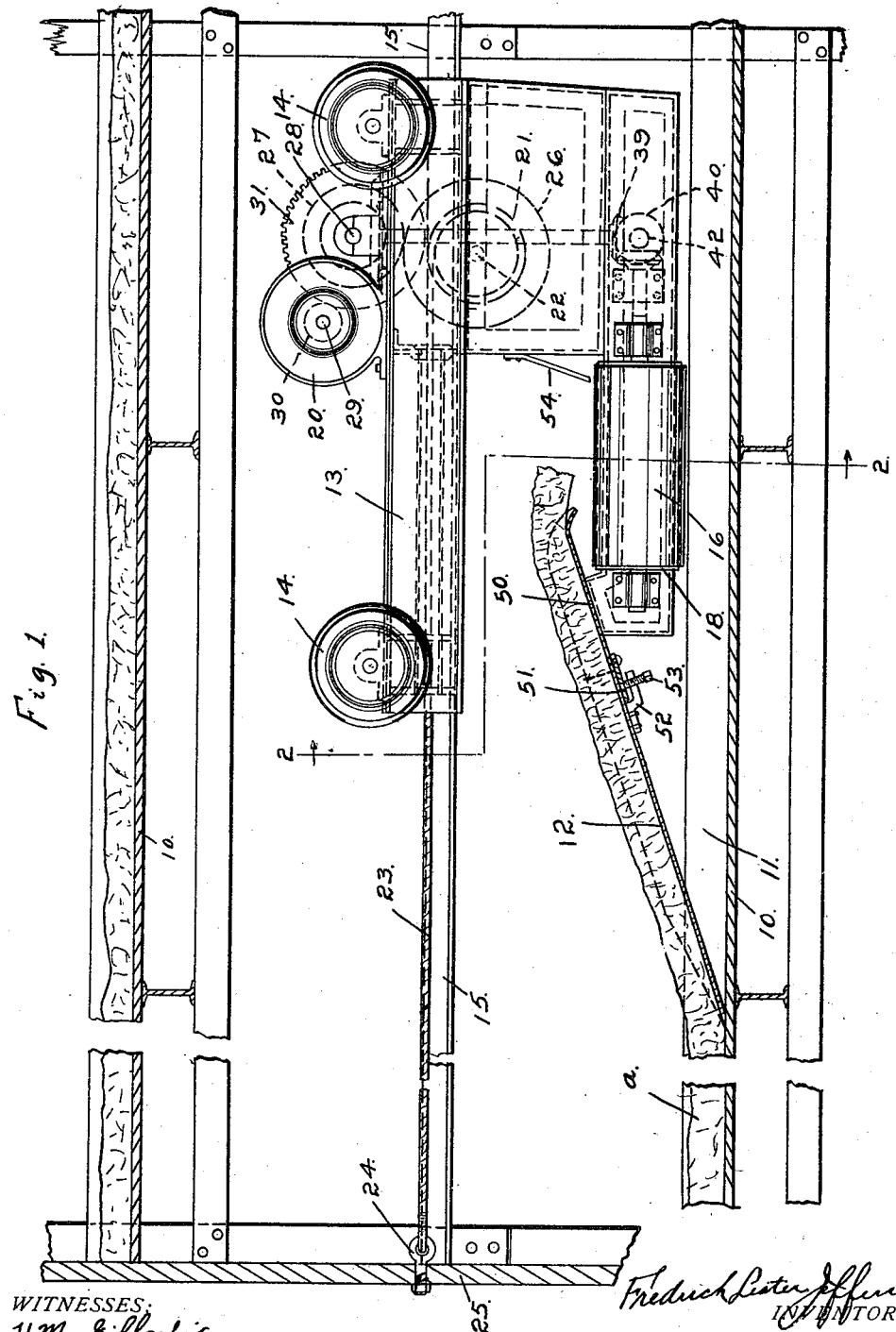

F. L. JEFFERIES.
APPARATUS FOR REMOVING STARCH FROM SETTLING TABLES.
APPLICATION FILED SEPT. 29, 1913.

1,134,615.

Patented Apr. 6, 1915.
4 SHEETS—SHEET 1.

WITNESSES:
H. M. Gillespie
J. B. Lagorio

Fredrich Lester Jefferies
INVENTOR.
BY Barnett & Truman
ATTORNEYS

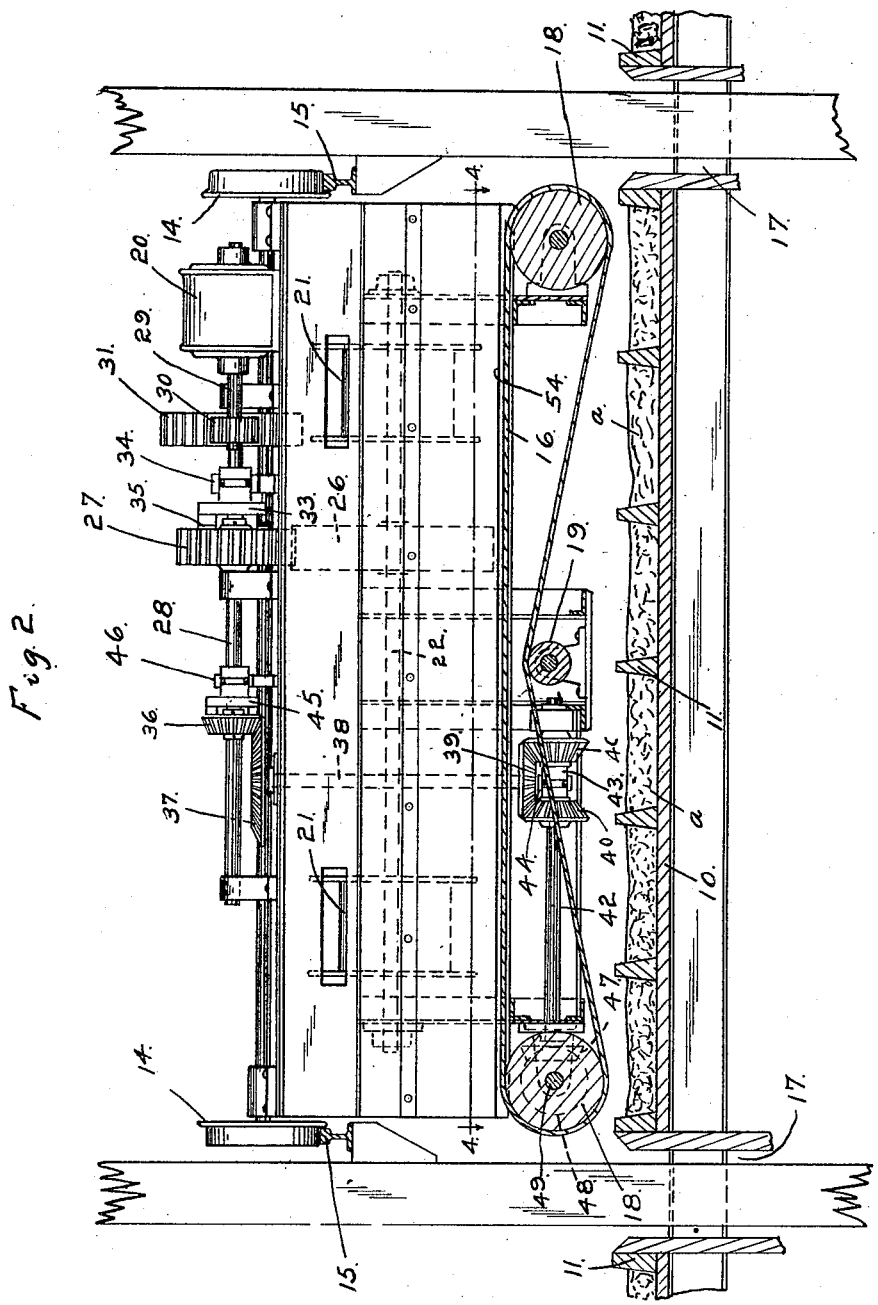

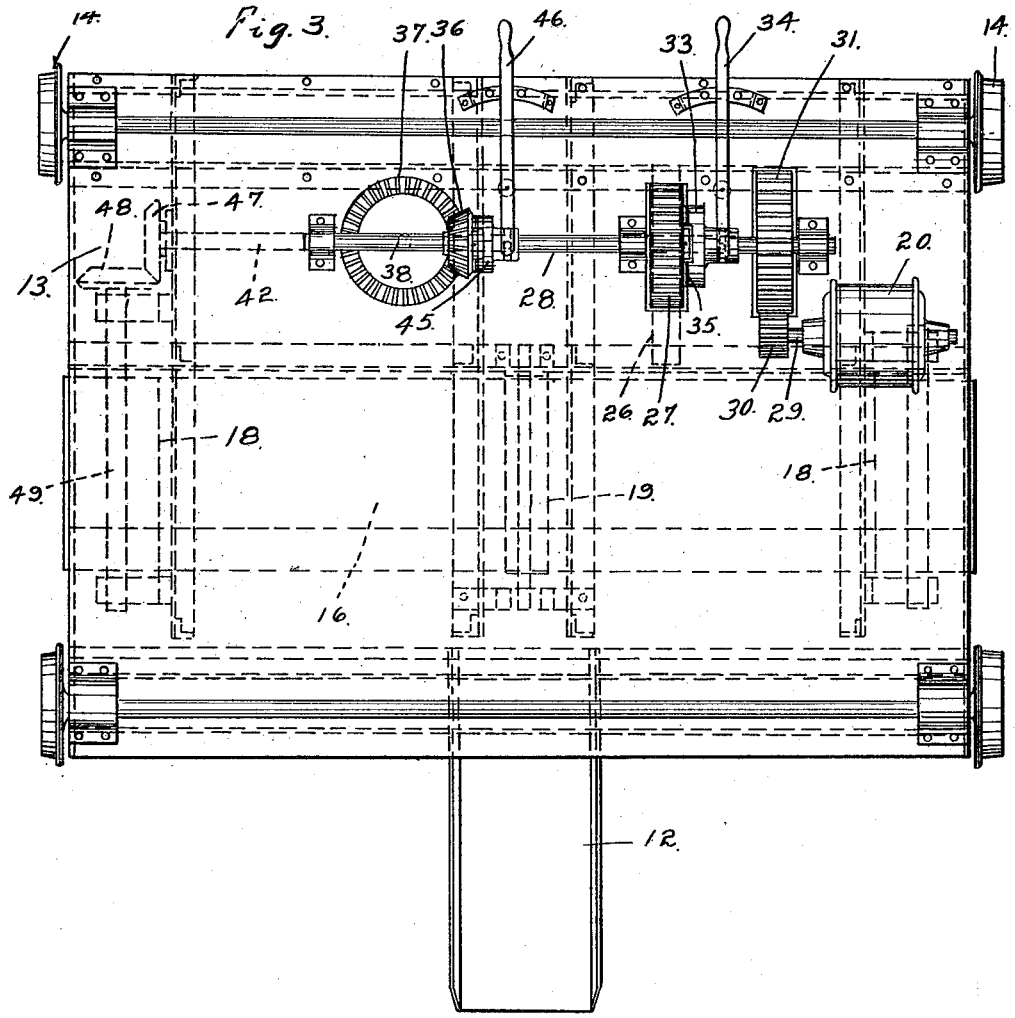

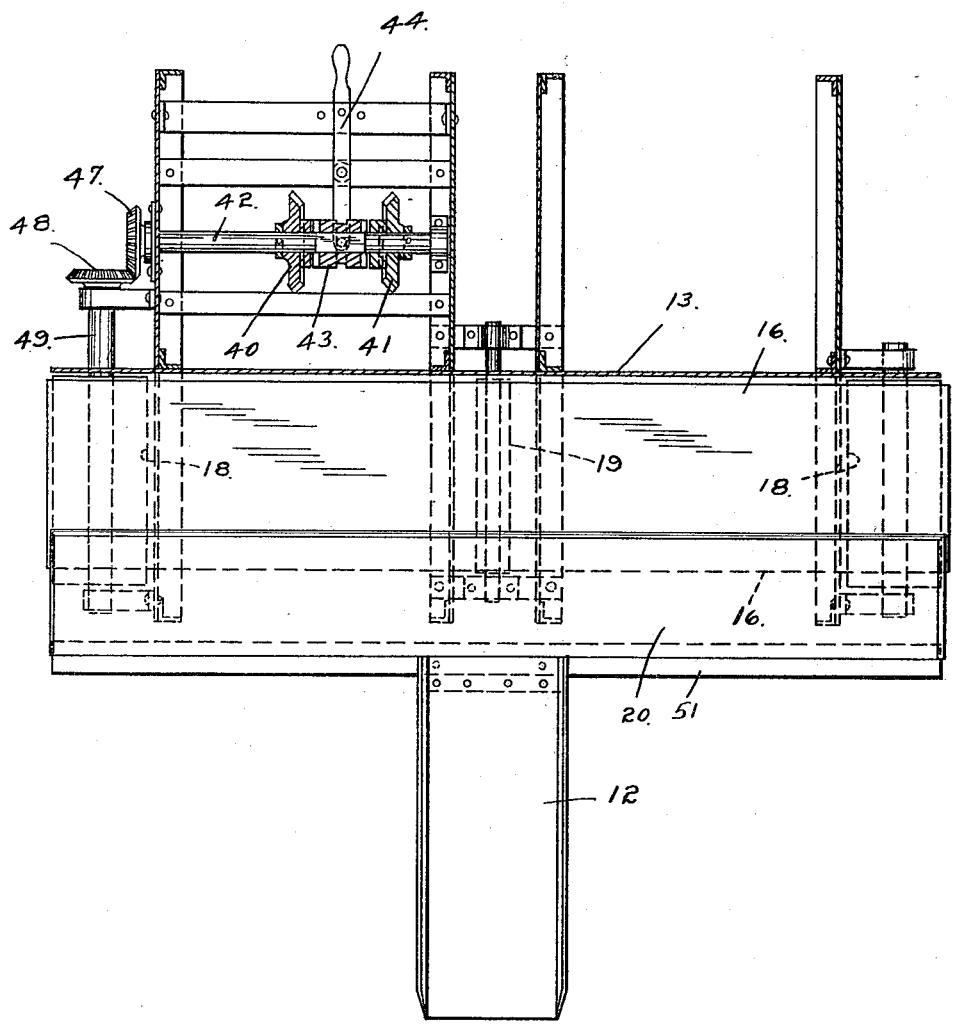

UNITED STATES PATENT OFFICE.

FREDRICK LESTER JEFFERIES, OF SUMMIT, ILLINOIS, ASSIGNOR TO CORN PRODUCTS REFINING COMPANY, A CORPORATION OF NEW JERSEY.

APPARATUS FOR REMOVING STARCH FROM SETTLING-TABLES.

1,134,615.  Specification of Letters Patent.  Patented Apr. 6, 1915.

Application filed September 29, 1913. Serial No. 792,379.

*To all whom it may concern:*

Be it known that I, FREDRICK L. JEFFERIES, a citizen of the United States, residing at Summit, in the county of Cook and State of Illinois, have invented certain new and useful Improvements in Apparatus for Removing Starch from Settling-Tables, of which the following is a specification.

My invention relates to the manufacture of starch and has for its object to provide an apparatus for removing starch from the starch tables and conveying it to a suitable place for further treatment.

Prior to my invention starch has been ordinarily shoveled from the tables by hand labor. This operation is slow, laborious and expensive.

My invention consists, primarily, in the provision of suitable apparatus for doing this work by machinery.

A further object of the invention is to provide, in combination with the stripping apparatus, a novel construction and arrangement of the starch tables whereby the operation of stripping the starch from the tables and removing it to the place of further treatment may be facilitated and cheapened.

The invention has for further objects such other new and improved constructions, arrangements and devices relating to the manufacture of starch as will be hereinafter described and claimed.

The invention is illustrated, in a preferred embodiment, in the accompanying drawings, wherein—

Figure 1 is a longitudinal sectional elevation of the apparatus shown in connection with the starch table on which the apparatus operates; Fig. 2, a sectional view on line 2—2 of Fig. 1; Fig. 3, a plan view of the apparatus, and Fig. 4, a sectional plan on line 4—4 of Fig. 2.

Like characters of reference designate like parts in the several figures of the drawings.

Referring to the drawings, 10 designates starch tables, the sides 11 of which are preferably inclined inwardly.

According to my invention the starch is removed from the tables by means of a stripping implement or wedge which is inclined with respect to the starch table operated upon and is moved lengthwise of the same with its lower edge in contact with the bottom of the table. The wedge 12 is shown as provided with flanges 12$^a$ but these are not essential although it is considered that they may be desirable under certain circumstances.

In the embodiment shown in the accompanying drawings, the stripping implement or wedge, designated 12, is a channel formed member adjustably supported on a carriage 13 which is propelled lengthwise of the starch tables above the same, the adjustability of the stripping implement being for the purpose of permitting the apparatus to operate successively on a series of tables arranged side by side. In the drawings, the carriage 13 is provided with wheels 14 which run upon a track 15 suitably supported above the tables 10. On the carriage is a transversely arranged conveyer 16 which receives the starch from the stripping implement 12 and transports the same to some suitable place of deposit. Preferably the tables are arranged in groups separated by chutes 17 into which the starch is delivered by the conveyer which is preferably capable of being driven in either direction so that it may deliver the starch into whichever chute may be nearest the table operated upon. The conveyer consists, as shown, of a belt mounted on rollers 18 with its lower run passing over a tension roller 19. The conveyer is driven by any suitable mechanism. I have shown, for this purpose, an electric motor 20 which is mounted on the carriage 13 and is also utilized for the purpose of propelling the carriage in the forward direction. To this end the carriage is provided with a pair of drums 21 fixed to a shaft 22, revolubly mounted on the carriage, upon which are wound cables 23 anchored at 24 to a fixed structure 25. On the shaft 22 is a gear wheel 26 which is meshed by a gear wheel 27 on a shaft 28. The shaft 29 of the motor 20 carries a pinion 30 which is meshed with a gear wheel 31 on a shaft 28 on which is slidably arranged a clutch member 33 operated by a lever 34 and adapted to engage with a clutch member 35 rigid with the gear 27. By this means the winding drums may be either connected with or disconnected from the motor.

The belt conveyer 16 is driven by motor 20 through the following train: Shaft 28 has loosely mounted thereon a bevel gear 36 meshing with a bevel gear 37 on the end of a vertical shaft 38 carrying at its lower end a bevel gear 39 meshed with a pair of bevel gears 40, 41 loosely mounted on a shaft 42 and adapted to be separately clutched to said shaft by the clutch 43 operated by lever 44. The bevel gear 36 is engaged with shaft 28 by means of a clutch 45 operated by a lever 46. Shaft 42 has fixed on one end thereof a bevel gear 47 meshing with a bevel gear 48 on the shaft 49 to which one of the belt rollers 18 is secured.

The stripping implement 12 is secured to an inclined receiving table 50 which extends across the machine from side to side with its upper end projecting over the conveyer 16. Any suitable means may be employed for attaching the stripping implement to this table which will permit the adjustment of the former. In the arrangement shown in the drawings, a strip 51 is secured to the under side of the table 50 and the wedge 12 is provided with brackets 52 for set screws 53 which bear against the strip so as to hold the wedge in position. Preferably a deflector 54 is arranged above the edge of the conveyer opposite to the receiving table 50 in order to prevent the starch from being forced or thrown from the conveyer.

The operation of the apparatus above described is as follows: The stripping implement or wedge is secured to the receiving table 50 as that it alines with one of the starch tables. The carriage is positioned so that the lower end of the wedge projects under the body of starch, designated $a$, on the table at the end of the table remote from the anchored end of the cables 23. When the motor is started up the stripping implement is moved along the table and the starch is removed from the table and forced in a continuous and substantially unbroken ribbon up over the inclined plane provided by the stripping implement across the receiving table 50, and delivered upon the conveyer 16. The conveyer is preferably run in the direction of the particular one of the chutes 17 which is nearest the table being stripped. The direction in which the conveyer is driven may be changed by means of clutch 43. The inward inclination of the sides of the starch tables makes it possible to remove the starch completely and cleanly as above described. When the starch has been removed from one table the carriage is backed to its initial position and the stripping implement readjusted so as to bring it into position to operate upon the next adjacent table.

It is my understanding that several attempts have been made heretofore to remove starch from starch tables by means of an inclined scoop, but so far as I am aware none of these efforts have been successful, due very largely to the fact that no modification was made in the sides of the starch tables. If the sides of the starch tables are vertical, as has always been customary, it is practically impossible to accomplish the removal of the starch, due to the stickiness and tenacity of the material and its tendency to break up into unmanageable lumps, by a scooping or wedging operation. By forming the starch tables with sides which incline inwardly from top to bottom the starch may be removed cleanly in the form of a practically continuous ribbon which remains unbroken or substantially unbroken until it is delivered on the transverse conveyer.

While I have described my invention as embodied in certain preferred constructions and arrangements, it will be understood that modifications might be made without departure from the principles of the invention.

I claim:

1. The combination with a starch table having sides which are inwardly inclined from top to bottom, of a starch stripping wedge, and means for moving the same from end to end of the table so as to strip and raise the starch therefrom in a continuous ribbon.

2. The combination with a starch table having sides which are inwardly inclined from top to bottom, of a starch stripping wedge, means for moving the same from end to end of the table so as to strip and raise the starch therefrom in a continuous ribbon, and a transversely arranged conveyer which receives the ribbon of starch from the wedge.

3. The combination with a plurality of starch tables in parallel arrangement having sides which are inwardly inclined from top to bottom, of a delivery chute at one side of the tables and parallel therewith, a carriage arranged so as to travel above and lengthwise of the tables, a conveyer on said carriage extending transversely of the tables and delivering into said chute, and a starch stripping wedge adjustably secured to the carriage so that it may operate upon any of said tables to strip and raise the starch therefrom and deliver the same to said conveyer.

4. The combination with a starch table having sides which are inwardly inclined from top to bottom, of a carriage arranged to move lengthwise of the table above the same, a conveyer on said carriage, and a starch stripping wedge on the carriage disposed so as to strip and raise the starch from said table and deliver the same to the conveyer.

5. The combination with a plurality of starch tables in parallel arrangement having sides which are inwardly inclined from top to bottom, of a delivery chute at one side of the tables and parallel therewith, a carriage arranged so as to travel above and lengthwise of the tables, a receiving table at the forward edge of the carriage, a conveyer arranged back of and below said receiving table, and a starch stripping wedge adjustably secured to the forward edge of said receiving table so that it may operate upon any of said starch tables to strip and raise the starch therefrom and deliver the same to said conveyer.

FREDRICK LESTER JEFFERIES.

Witnesses:
GENEVIEVE KENNEDY,
W. C. SCANNELL.

Copies of this patent may be obtained for five cents each, by addressing the "Commissioner of Patents, Washington, D. C."